(12) United States Patent
Ghoukasian et al.

(10) Patent No.: US 11,518,448 B2
(45) Date of Patent: Dec. 6, 2022

(54) VEHICLE TAILGATE

(71) Applicants: Eric Ghoukasian, Auburn Hills, MI (US); Richard R Sukhdeo, Auburn Hills, MI (US); Clifford L Eberle, Jr., Clarkston, MI (US); Vivek Kirtane, Troy', MI (US); Vinaya Sridhar, Auburn Hills, MI (US); David R Parks, Macomb, MI (US); Robert J Gibbs, Novi, MI (US); Paul A Steffes, Oxford, MI (US); Christopher J Sytek, Auburn Hills, MI (US); Vinayak D Gadre, Sterling Heights, MI (US)

(72) Inventors: Eric Ghoukasian, Auburn Hills, MI (US); Richard R Sukhdeo, Auburn Hills, MI (US); Clifford L Eberle, Jr., Clarkston, MI (US); Vivek Kirtane, Troy', MI (US); Vinaya Sridhar, Auburn Hills, MI (US); David R Parks, Macomb, MI (US); Robert J Gibbs, Novi, MI (US); Paul A Steffes, Oxford, MI (US); Christopher J Sytek, Auburn Hills, MI (US); Vinayak D Gadre, Sterling Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 130 days.

(21) Appl. No.: 17/166,712

(22) Filed: Feb. 3, 2021

(65) Prior Publication Data

US 2021/0237808 A1     Aug. 5, 2021

Related U.S. Application Data

(60) Provisional application No. 62/969,843, filed on Feb. 4, 2020.

(51) Int. Cl.
*B62D 33/027*     (2006.01)
*B62D 33/037*     (2006.01)

(52) U.S. Cl.
CPC ....... *B62D 33/0273* (2013.01); *B62D 33/037* (2013.01)

(58) Field of Classification Search
CPC .. B62D 33/03; B62D 33/0273; B62D 33/037; E05B 85/24; E05B 85/045; E05B 83/20; E05B 15/0245; E05D 15/522
See application file for complete search history.

(56) References Cited

U.S. PATENT DOCUMENTS

| 4,826,374 A | 5/1989 | Baglin |
| 5,193,868 A | 3/1993 | O'Toole |

(Continued)

FOREIGN PATENT DOCUMENTS

| EP | 3061636 | 8/2016 |
| JP | 4021821 B2 | 12/2007 |

*Primary Examiner* — Gregory A Blankenship
(74) *Attorney, Agent, or Firm* — Ralph E. Smith

(57) ABSTRACT

A vehicle tailgate (30) has a frame (40) with a cross beam (42) and a pair of side beams (44, 46). One side beam (44, 46) extends from each end of the cross beam (42). A first metal tapping plate (50, 150) is secured with the cross beam (42). At least one elongated tang (56) is positioned between the body (52) and each tab (54). A clevis bracket (82) is positioned on the side beams (44, 46). An overmolded (108) material is on the shaft (100, 102) and the two heads (96, 98) of the striker (88). The wedges (92, 94), on the clevis bracket (82), aligns the clevis bracket (82) with the striker (84). A second tapping plate (70) is secured to the sheet metal.

20 Claims, 14 Drawing Sheets

(56) References Cited

U.S. PATENT DOCUMENTS

| | | | |
|---|---|---|---|
| 5,558,369 A | 9/1996 | Cornea et al. | |
| 5,707,095 A * | 1/1998 | Pribak | B62D 33/037 |
| | | | 292/264 |
| 6,073,980 A * | 6/2000 | Arabia, Jr | E05B 85/045 |
| | | | 292/216 |
| 6,616,204 B1 | 9/2003 | Mitts et al. | |
| 6,644,902 B1 | 11/2003 | Cutshall | |
| 6,805,393 B1 | 10/2004 | Stevenson et al. | |
| 6,814,401 B2 | 11/2004 | Takada | |
| 7,556,303 B2 | 7/2009 | Waldner et al. | |
| 7,628,445 B2 | 12/2009 | Chen et al. | |
| 8,469,413 B2 | 6/2013 | Novajovsky et al. | |
| 8,740,279 B1 | 6/2014 | McGoff et al. | |
| 10,308,291 B2 | 6/2019 | Seki et al. | |
| 10,358,172 B2 | 7/2019 | Morley et al. | |
| 10,731,393 B2 * | 8/2020 | Ihrke | B60J 5/108 |
| 11,014,512 B2 * | 5/2021 | Ledwith | B60J 5/10 |
| 11,198,478 B2 * | 12/2021 | Sodhi | B62D 33/0273 |
| 2003/0025348 A1 * | 2/2003 | Bobbitt, III | B62D 33/037 |
| | | | 296/57.1 |
| 2004/0056516 A1 | 3/2004 | Takada | |
| 2004/0119300 A1 | 6/2004 | Strable et al. | |
| 2006/0249971 A1 * | 11/2006 | Ichinose | B62D 33/0273 |
| | | | 296/51 |
| 2008/0217930 A1 | 9/2008 | Bennett | |
| 2010/0172715 A1 | 7/2010 | Tucker, II | |
| 2012/0086224 A1 * | 4/2012 | Novajovsky | E05B 85/045 |
| | | | 292/341.18 |
| 2012/0324793 A1 | 12/2012 | Abbasi et al. | |
| 2013/0232754 A1 * | 9/2013 | Cutting | E05B 79/02 |
| | | | 33/600 |
| 2019/0032375 A1 * | 1/2019 | Tsai | E05B 83/10 |
| 2021/0237808 A1 * | 8/2021 | Ghoukasian | B62D 33/037 |
| 2021/0245818 A1 * | 8/2021 | Van Norman | B62D 33/0273 |

* cited by examiner

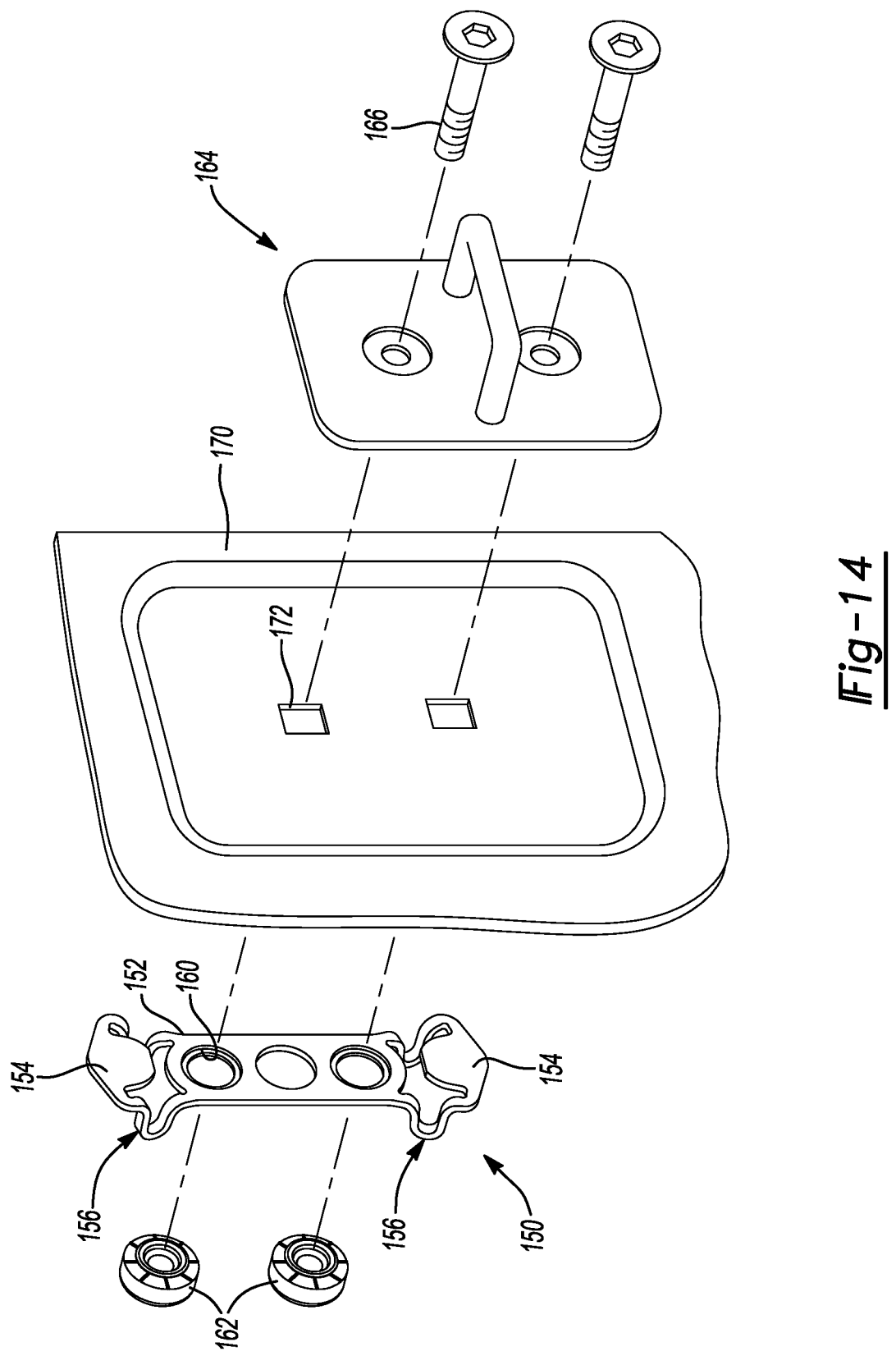

VEHICLE TAILGATE

CROSS-REFERENCE TO RELATED APPLICATION

This application claims the benefit of U.S. Provisional Application No. 62/969,843, filed on Feb. 4, 2020. The entire disclosure of the above application is incorporated herein by reference.

FIELD

The present disclosure relates to a vehicle with a cargo box, such as a pick-up truck, that has a multi-functional tailgate.

BACKGROUND

A pick-up truck disclosed in U.S. Pat. No. 8,740,279 entitled "Multi-Functional Tailgate For A Vehicle" issued Jun. 3, 2014 as well as U.S. Pat. No. 10,358,172 entitled "Latching Assembly For Multi-Functional Tailgate Door" issued Jul. 23, 2019, both of which are assigned to the assignee of the present application, the specification and drawings of which are herein incorporated by reference in their entirety, include multi-functional tailgates spanning a width of the aft end of the cargo bed. The multi-functional tailgate is pivotally coupled to the cargo bed so that multi-functional tailgate is allowed to pivot about a horizontal axis between a horizontal open position and a closed position. The multi-function tailgate also includes two doors that can be latched together so as to pivot together, in the manner described above, or unlatched so as to pivot independently of each other. In the unlatched position, each door can rotated independently about the horizontal axis, between the horizontal open position and the closed position, and about a vertical axis, between a vertical open position and the closed position. When unlatched and pivotable about the vertical axis, each door is vulnerable to sag due to the latching assembly being unable to adapt well to the multi-functional aspect of the tailgate door. The present disclosure provides a latch assembly that restricts sag in each door when the multi-functional tailgate is unlatched and pivoted about the vertical axis.

SUMMARY

In one aspect of the disclosure, there is provided a vehicle that includes a cargo box having a floor deck, a pair of sidewalls, a front wall panel, and a rear aft opening configured for receipt of a tailgate having a pair of doors. The vehicle also includes a frame having a cross beam and a pair of side beams, where one side beam extends from each end of the cross beam and the pair of doors are attached to the frame. A clevis bracket is positioned on each of the side beams. Each of the clevis brackets is configured for receipt of a striker provided on each of the sidewalls, where the strikers each include two heads, a shaft, and an overmold material on the two heads and the shaft. In addition, the clevis bracket includes a pair of opposing wedges that are positioned between the two heads that is configured to align the clevis bracket with the striker.

According to the first aspect, the clevis bracket includes a plate having a pair of slots configured for receipt of a fastener, and the slots are elongated to enable positioning of the clevis bracket relative to the striker.

According to the first aspect, the clevis bracket includes an opening that is defined by the pair of opposing wedges, and the pair of opposing wedges are configured to restrict movement of the striker along an axis of the striker.

According to the first aspect, the pair of opposing wedges are configured to align the clevis bracket with the striker.

According to the first aspect, a first head of the two heads is positioned on one side of the pair of opposing wedges, and the second head of the two heads is positioned on another side of the pair of opposing wedges.

According to the first aspect, a tool may be provided for positioning the clevis bracket on the side beam that enables adjustment of the clevis bracket relative to the striker during assembly.

According to the first aspect, the tool includes a body and a pair of projecting wedges are configured to be aligned with the pair of opposing wedges to enable positioning of the striker into the tool.

According to the first aspect, the vehicle may also include a first metal tapping plate secured with the cross bream. The metal tapping plate has an elongated body with a tab at each end along a longitudinal axis and at least one elongated tang being positioned between the body and each tab, where the at least one tang is configured to enable movement of the body to enable alignment of the first metal tapping plate relative to the cross-beam. A second tapping plate may also be provided that is secured to a sheet metal of at least one of the doors, wherein the second tapping plate includes a metal base of the same material as the sheet metal and a metal clinch fastener secured to the base, and the clinch fastener is of a different material than the base.

According to the first aspect, the first metal tapping plate includes a joggle between the tabs and body.

Lastly, according to the first aspect, the metal base of the second tapping plate includes an elongated body with a tab at each end. The tabs are offset with respect to the elongated body such that a gap is formed between a plane passing through a front surface of the tabs and a plane passing through a front surface of the elongated body, and an elongated tang is positioned between each tab and the elongated body, where the at least one tang extends perpendicular to the planes, and the at least one tang is configured to enable adjustment of the elongated body in three degrees of directional movement with respect to the tabs when the tabs are secured to the sheet metal.

According to a second aspect of the present disclosure, there is provided a tailgate for a vehicle that includes a frame configured to be coupled to the vehicle. The frame has a cross beam and a pair of side beams, where one side beam extends from each end of the cross beam. A pair of doors are attached to the frame, and a clevis bracket is positioned on each of the side beams. Each of the clevis brackets is configured for receipt of a striker provided on the vehicle, where the strikers each include two heads, a shaft, and an overmold material on the two heads and the shaft. The clevis bracket includes a pair of opposing wedges that are positioned between the two heads that is configured to align the clevis bracket with the striker.

According to the second aspect, the clevis bracket includes a plate having a pair of slots configured for receipt of a fastener, and the slots are elongated to enable positioning of the clevis bracket relative to the striker.

According to the second aspect, the clevis bracket includes an opening that is defined by the pair of opposing wedges, where the pair of opposing wedges are configured to restrict movement of the striker along an axis of the striker.

According to the second aspect, the pair of opposing wedges are configured to align the clevis bracket with the striker.

According to the second aspect, a first head of the two heads is positioned on one side of the pair of opposing wedges, and the second head of the two heads is positioned on another side of the pair of opposing wedges.

According to the second aspect, a tool may be provided for positioning the clevis bracket on the side beam that enables adjustment of the clevis bracket relative to the striker during assembly.

According to the second aspect, the tool includes a body and a pair of projecting wedges are configured to be aligned with the pair of opposing wedges to enable positioning of the striker into the tool.

According to the second aspect, the tailgate may also include a first metal tapping plate secured with the cross bream. The metal tapping plate has an elongated body with a tab at each end along a longitudinal axis and at least one elongated tang is positioned between the body and each tab, where the at least one tang is configured to enable movement of the body to enable alignment of the first metal tapping plate relative to the cross-beam. The tailgate may also include a second tapping plate secured to a sheet metal of at least one of the doors, where the second tapping plate includes a metal base of the same material as the sheet metal and a metal clinch fastener secured to the base, where the clinch fastener is of a different material than the base.

According to the second aspect, the first metal tapping plate includes a joggle between the tabs and body.

Lastly, according to the second aspect, the metal base of the second tapping plate includes an elongated body with a tab at each end. The tabs are offset with respect to the elongated body such that a gap is formed between a plane passing through a front surface of the tabs and a plane passing through a front surface of the elongated body. An elongated tang is positioned between each tab and the elongated body. The at least one tang extends perpendicular to the planes, and the at least one tang is configured to enable adjustment of the elongated body in three degrees of directional movement with respect to the tabs when the tabs are secured to the sheet metal.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 14 is an exploded perspective view of a tapping plate.

DETAILED DESCRIPTION

Figure 1:
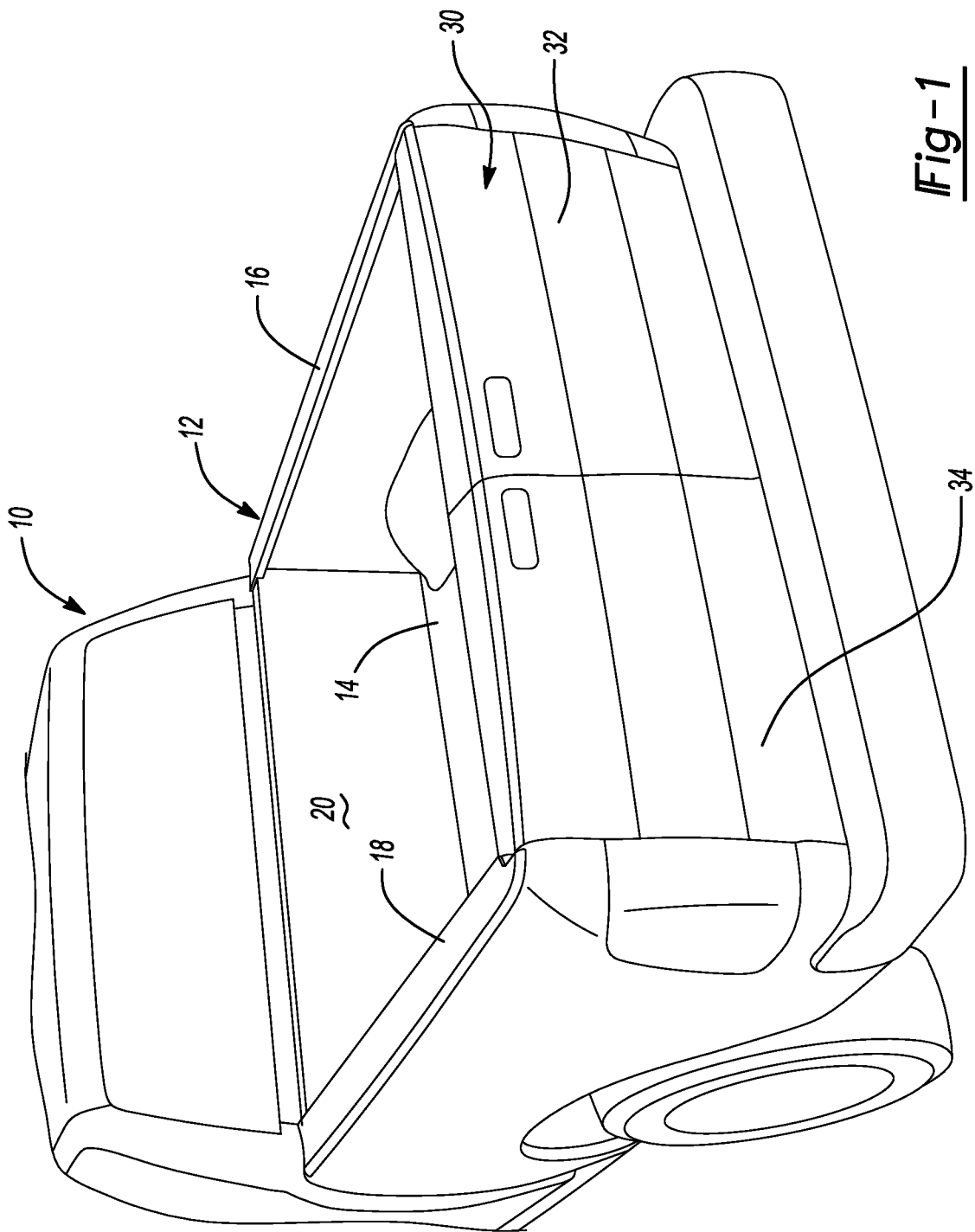
FIG. 1 is a perspective view of a vehicle with the tailgate assembly according to the disclosure.

Turning to FIG. 1, a vehicle is illustrated and designated with the reference numeral 10. The vehicle 10 includes a cargo box 12. The cargo box 12 includes a floor deck 14, a pair of side walls 16, 18 and a front wall panel 20. Also, the cargo box 12 includes a rear or aft opening that receives a tailgate 30. The tailgate 30 includes a pair of doors 32, 34. The doors 32, 34 may have the same size or can be of different sizes.

Figure 2:
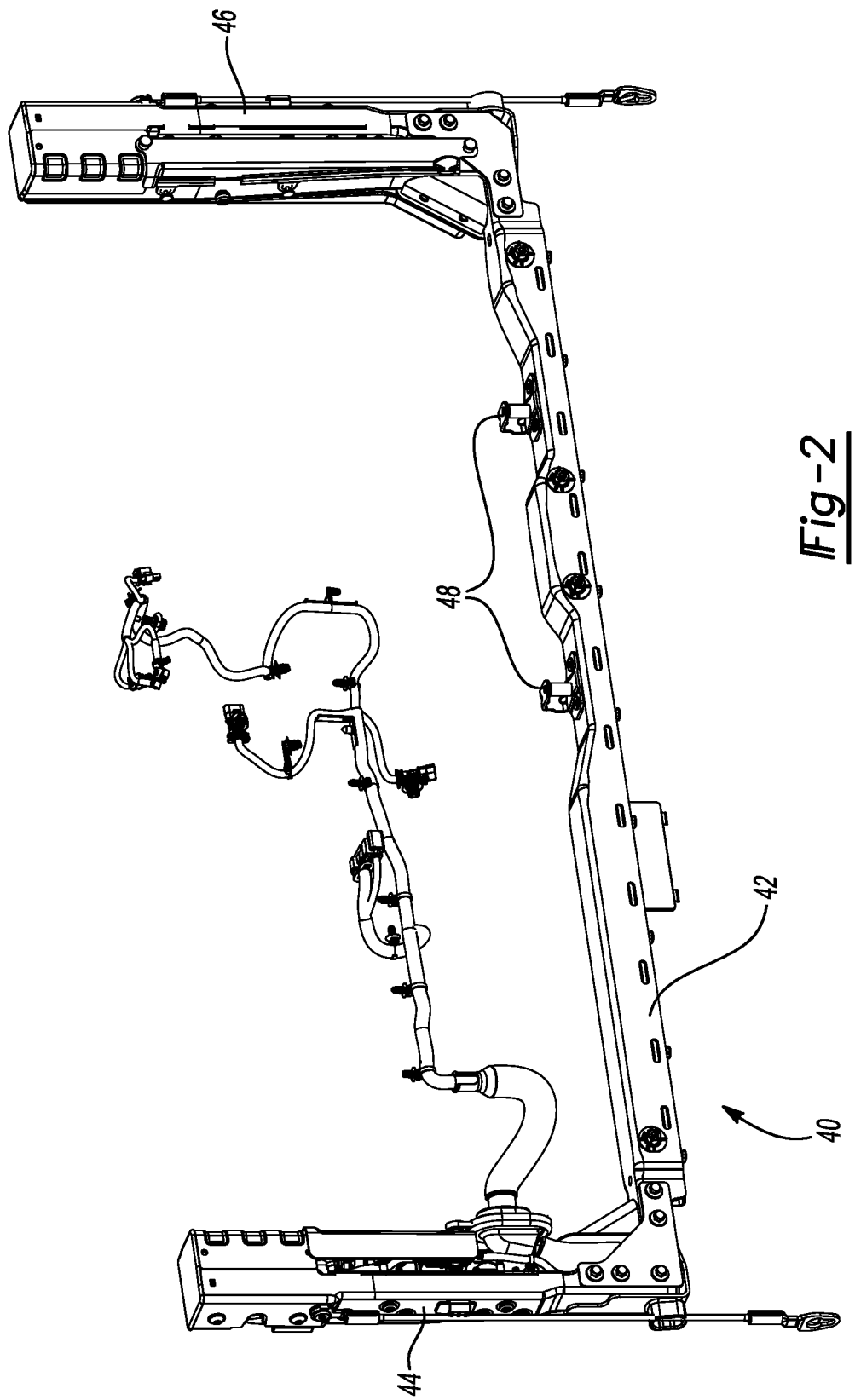
FIG. 2 is a perspective view of the vehicle tailgate with the doors removed.
Figure 3:
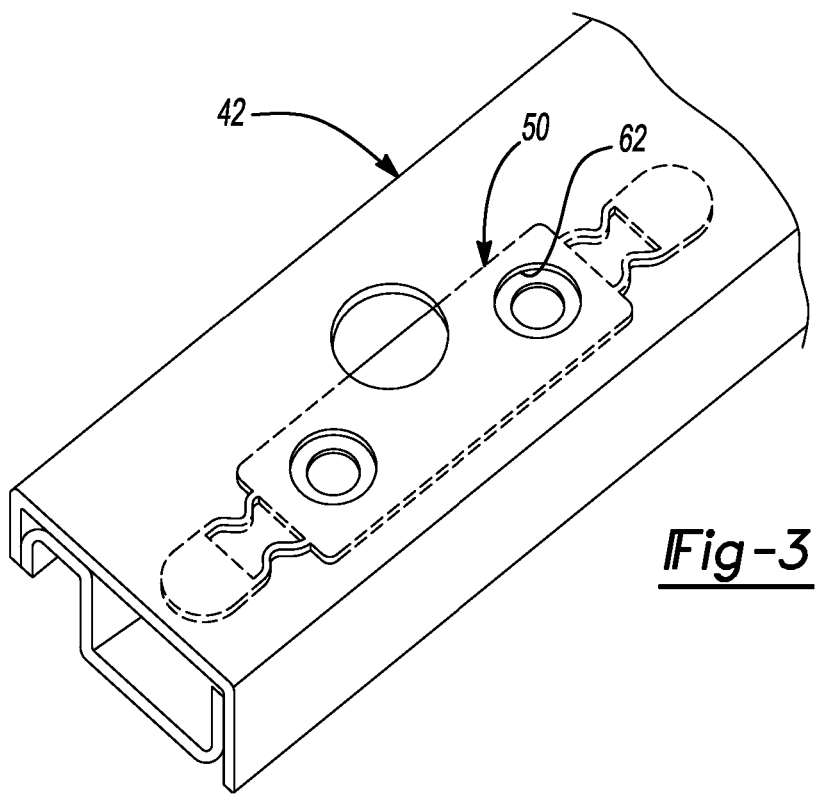
FIG. 3 is a partial perspective phantom view of a frame with a tapping plate.
Figure 4:
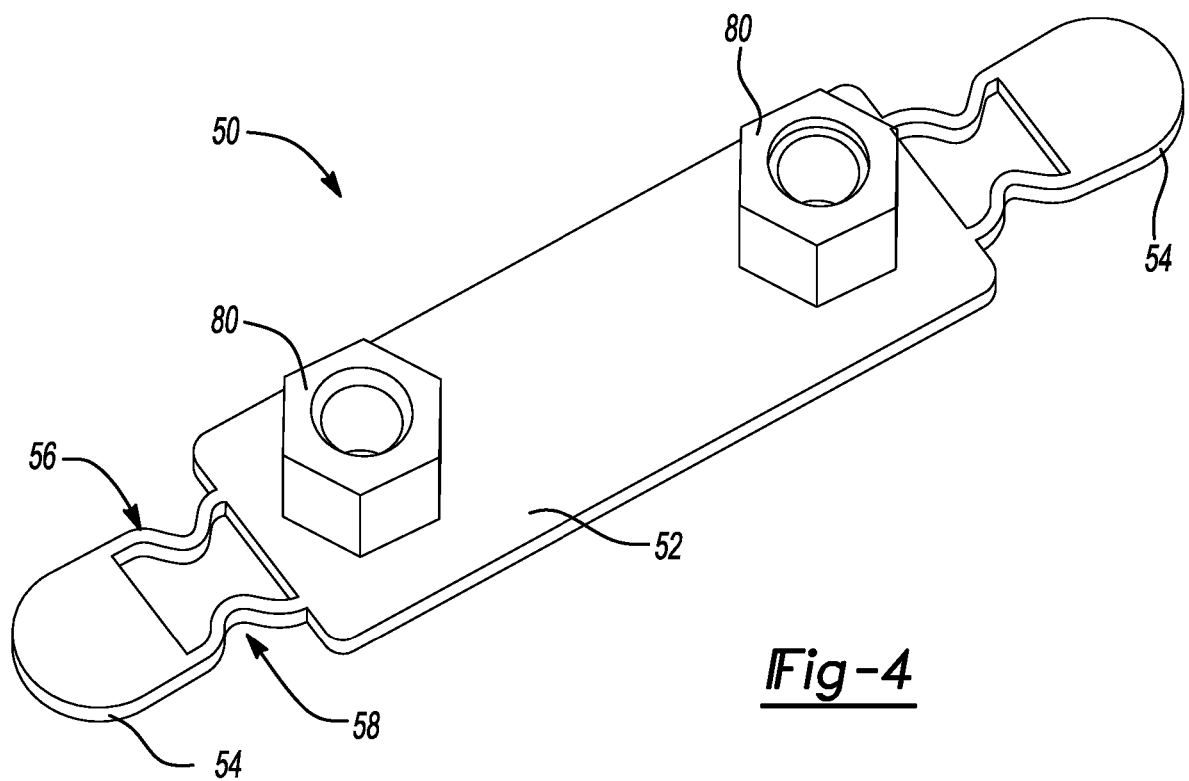
FIG. 4 is a perspective view of the rear side of the tapping plate of FIG. 3.

FIG. 2 illustrates a door frame 40 positioned on the vehicle (in phantom). The door frame 40 includes a cross beam 42 and a pair of side beams 44, 46. The cross beam 42 includes a pair of strikers 48 that are attached to the cross beam via a pair of tapping plates 50.

Each tapping plate 50 has a body 52, tabs 54 and tangs 56. The body 52 has an overall elongated rectangular shape. The body 52 is steel and includes apertures 53. The steel nuts 55 are secured, by clinching or welding, with the body and in alignment with the apertures 53. The tabs 54 have a rectangular shape with a rounded end. The tabs 54 enable the tapping plate 50 to be welded to the cross beam 42. The tangs 56 includes a joggle 58. The joggle 58 enables positioning of the body 52 with respect to the tabs 54 once the tabs 54 are welded to the cross member 42.

The tangs 56 and joggle 58 enable deformation or movement of the body 52 once it is welded in position. The tangs 56 and joggle 58 enables lateral and longitudinal movement of the body 52 with respect to the tabs 54. Bolts 60 pass into the body 52 and nuts 55. The bolts 60 are aligned within the oversized apertures 62 on the cross beam 42. Accordingly, the tapping plate body 52 can be moved longitudinally, front and rear, or side to side, with respect to the longitudinal axis of the cross beam 42. This provides alignment of the strikers 48 that are secured with the tapping plate body 52. Thus, the strikers 48 can be moved fore and aft, side to side, to compensate for alignment of the doors 32, 34 with respect to one another. This enables a flush alignment of the doors 32, 34 with respect to one another.

Figure 5:
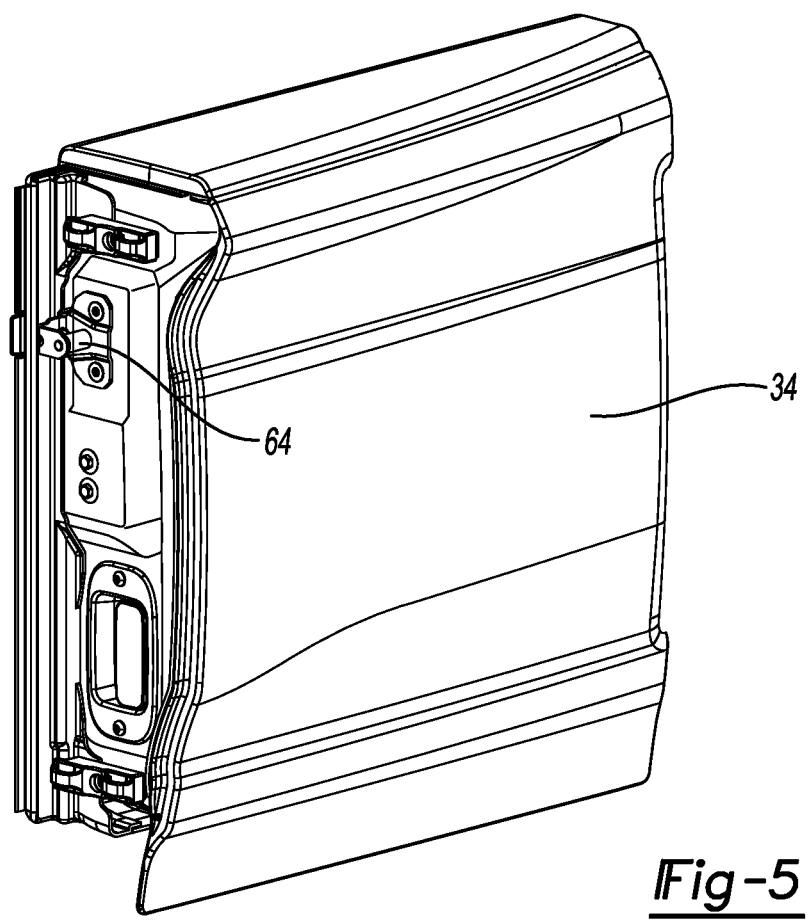
FIG. 5 is a perspective view of one of the doors.
Figure 6:
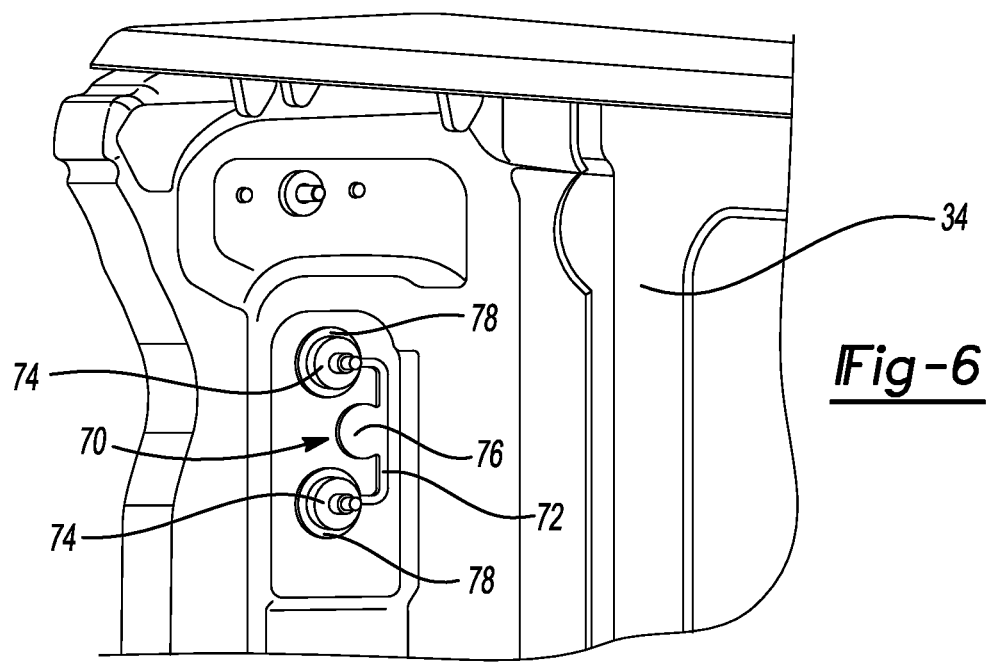
FIG. 6 is a perspective view partially in cross-section of FIG. 5.

FIGS. 5 and 6 illustrates a side of the door 34. The door 34 has an aluminum sheet or covering. The aluminum sheet or skin receives a striker 64. The striker 64 is secured to the aluminum sheet or skin via a tapping plate 70. The tapping plate 70 includes a base 72 as well as clinch nuts 74. The base 72 has an overall U-shape. The tapping plate 70 is formed from an aluminum material. A nub 76, on the web, enables the aluminum base 72 to be welded to the aluminum sheet metal. The base legs each include a pad 78 at an end of the legs. The pads 78 have the steel or the link clinched fasteners 74 stamped into and secured with the pads 78. Thus, the aluminum base 72, via a nub 76, can be welded to the aluminum sheet or skin. The legs are movable to enable the pads and fasteners to be adjusted to receive the bolts that receive the striker 64 on the door 34. A steel clinch fastener 74 can be utilized to receive threaded fasteners passing through the striker 64 to hold the striker 64 in place on the door 34. This increases the strength of the fasters 74 receiving bolts that hold the striker 64 in place. Thus, an aluminum tapping plate with steel fasteners is secured to the aluminum sheet metal door Turning to FIGS. 14-17, an additional deformable tapping plate is illustrated. Here, the tapping plate 150 includes a body 152, tabs 154 and tangs 156. The body 152 has an overall rectangular configuration with a plurality of apertures. Two of the apertures 160 receive clinch nuts 162 that are secured to the body 152 to enable the receipt of bolts or the like to secure the striker plate 164 with the tapping plate 150. The body 152, via the tangs 156, is provided with four degrees of directional movement such that the body 152 can move toward or away from the tabs 154 and longitudinal with respect to the body as well as laterally with respect to the body.

The tangs 156 have an overall U shape and extend substantially perpendicularly away from the body and tabs 154. Thus, the tangs 156 enables the movement of the body 152 with respect to the tabs 154 once the tabs 154 are spot welded to a pillar or beam.

As seen in FIGS. 14-17, the tapping plate 150 is spot welded to the pillar or beam 170. As can be seen, the pillar or beam 170 includes a pair of apertures 172 each having an overall rectangular configuration that enables access to the apertures 160 that include the clinch nuts 162. Thus, a bolt 166 can be passed through the striker plate 164 into the clinch nuts 162 and secure the striker plate 164 with the tapper plate 150.

Additionally, the installed tapping plate 150 provides for temporary coupling of a paint assist tool 180 used during emersion in the electrolyte paint tank. The paint assist tool 180 utilizes the same holes on the body 152 that are later used for the striker bolts. After the electrolyte tank dip and painting, the paint assist tool 180 can be removed from the tapping plate 150. The paint assist tool 180 holds the door open or ajar away from the pillar or beam so that the tapping plate 150 enables the electrolyte/paint to drain through the nuts eliminating hunting for the nuts during installation of the bolts. Also, the paint assist tool 180 holds the door away from the pillar.

Figure 17:
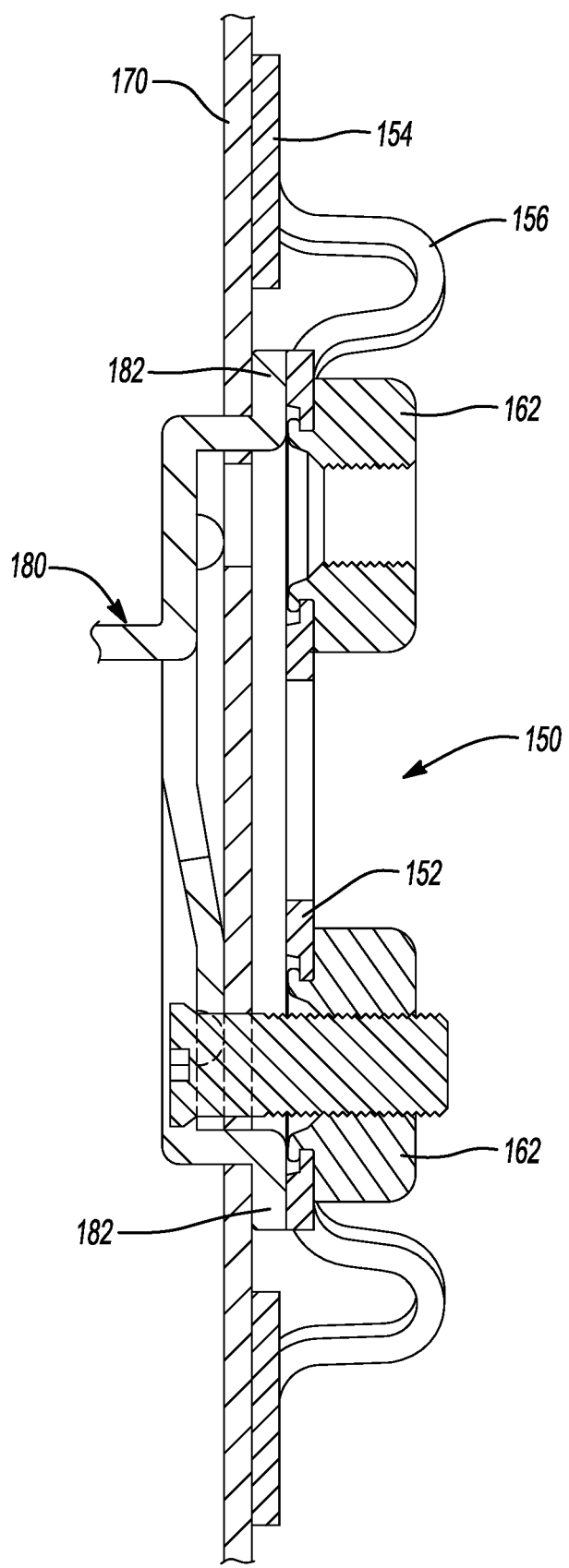
FIG. 17 is a cross-section view of FIG. 16.

As can be seen, the paint assist tool 180 includes tongues 182 that extends away from the body 184. The tongues 182 are inserted between the sheet metal pillar and plate, body 152 into the gap between the two as seen in FIG. 17. Thus, this enables a fasteners to be passed through an aperture in the body 184 to secure the other end of the paint assist tool 180 with the tapping plate 150. Also, the paint assist tool includes arms 186 that provide a gap 188 to receive the door. Thus, paint assist tool holds the door away from the pillar so that the electrolyte/paint can be applied without the door in contact with the pillar.

After the electrolyte/paint is applied to the body in white, the paint assist tool 180 is removed. After removal, the striker plate 164 is attached to the tapping plate 150. As this occurs, with the bolts secured into the clinch nuts, the tapping plate 152 is drawn towards the striker plate body. As this occurs, the tapping plate body 152 comes into contact with the pillar eliminating the gap between the tabs 154 and the body 152. Thus, once the striker plate 164 is applied to the vehicle, the tabs 154 and body 152 surfaces are on the same plane.

Figure 7:
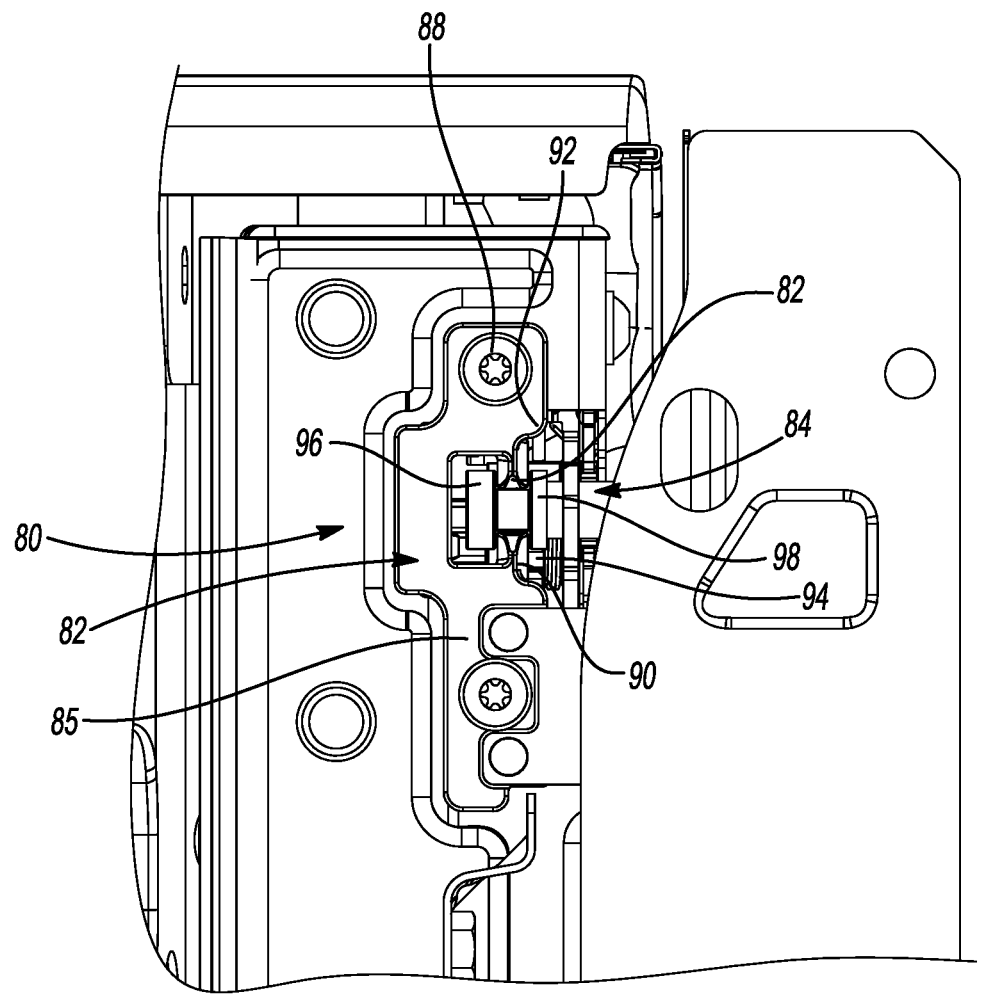
FIG. 7 is an elevation view of a tailgate pivot.
Figure 8:
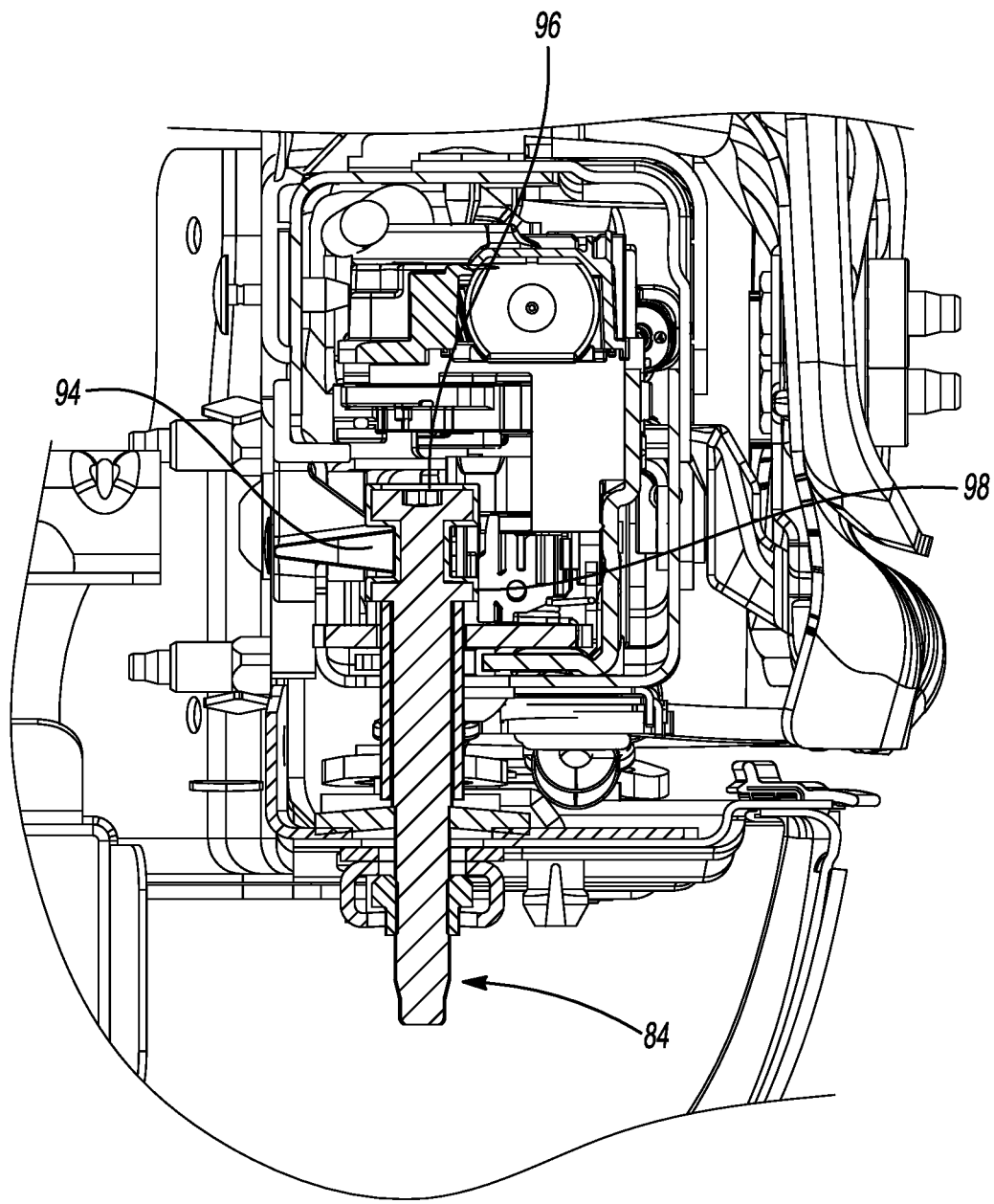
FIG. 8 is a cross-section view of FIG. 7.

Turning to FIG. 7, a top pivot mechanism 80 for the doors 32, 34 is illustrated. The pivot mechanism 80 includes a clevis bracket 82 and a striker 84. The clevis bracket 82 includes a plate 86 with an overall rectangular configuration. The plate 84 has a pair of slots 86 that enable the fasteners 88, to pass through the plate 85, and be received in the nuts. The slots are elongated to enable positioning of the clevis bracket 82 with respect to the striker 84 as will be explained later.

The clevis bracket 82 includes an opening 90 that enables passage of the striker 84. The opening 90 is defined by a pair of opposing wedges 92, 94. The wedges 92, 94 restrict movement of the striker 84 along the axis of the striker 84. Thus, this improves the quality feel of the doors 32, 34 and reduces sag of the doors 32, 34 and increases the durability. The wedges 92, 94 self-align the clevis bracket 82 with the striker 84. The first head 96 of the striker 84 is positioned on one side of the wedges 92, 94 and the second head 98 of the striker 84 is positioned on the other side of the wedges 92, 94 sandwiching the wedges 92 between the two head 96, 98. The slots 86 enable the clevis bracket 82 to freely move with respect to the bolts to self-align the clevis bracket with respect to the striker 84. This omits the need for shims and thus reduces parts and increases the process time.

The striker 84 includes a shaft portion 100 between the heads 96, 98. An additional shaft portion 102 extends from the second head 98 and includes the threaded portion 104 of the shaft. Also, a washer 106 is positioned between the shaft portion 102 and the threaded portion 104.

An overmold 108, of a plastic material, covers the shaft portions 102, 100 and heads 96, 98. The overmold 108 terminates at the washer 106. The overmold 108 provides a barrier between the metal of the striker 84 and a latch to increase durability of the components and improve sound quality. Thus, the overmold 108 on the striker 84 enables for plastic to be molded on all the required surfaces of the striker 84, along the axis of the shaft portions 100, 102 and around the striker heads 96, 98. This is not possible with a split piece of plastic. Thus, the overmold design provides durability and reduces the buzz, squeak, rattle noise created by metal to metal contact.

Previously known solutions for setting the internal clevis bracket involve several iterated steps. The striker would be a fixture set and the clevis would be soft torqued onto the tailgate. The tailgate would be closed and reopened several times loosening and adding shims and then tighten the internal clevis fasteners. This is repeated until the interaction is correct. This assembly process was a challenge due to the tight tolerance between the striker and the clevis bracket. The internal clevis bracket is correctly set when there is no drag interference with the striker during closing and opening operations.

The drawback in the iterative process is that it is cumbersome and delayed the vehicle throughout the assembly plant.

Figure 9:
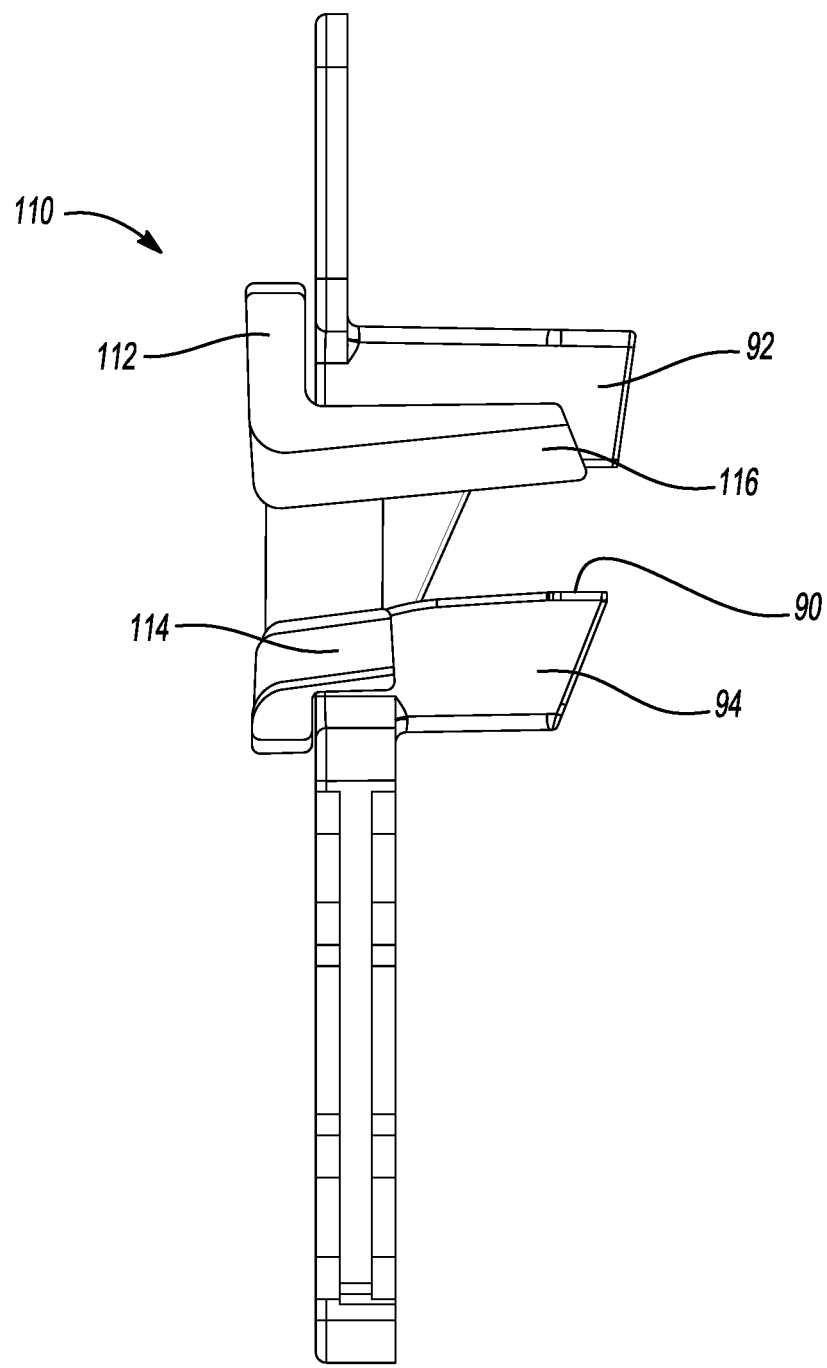
FIG. 9 is a side elevation view of the pivot clevis bracket with the insertion tool.
Figure 10:
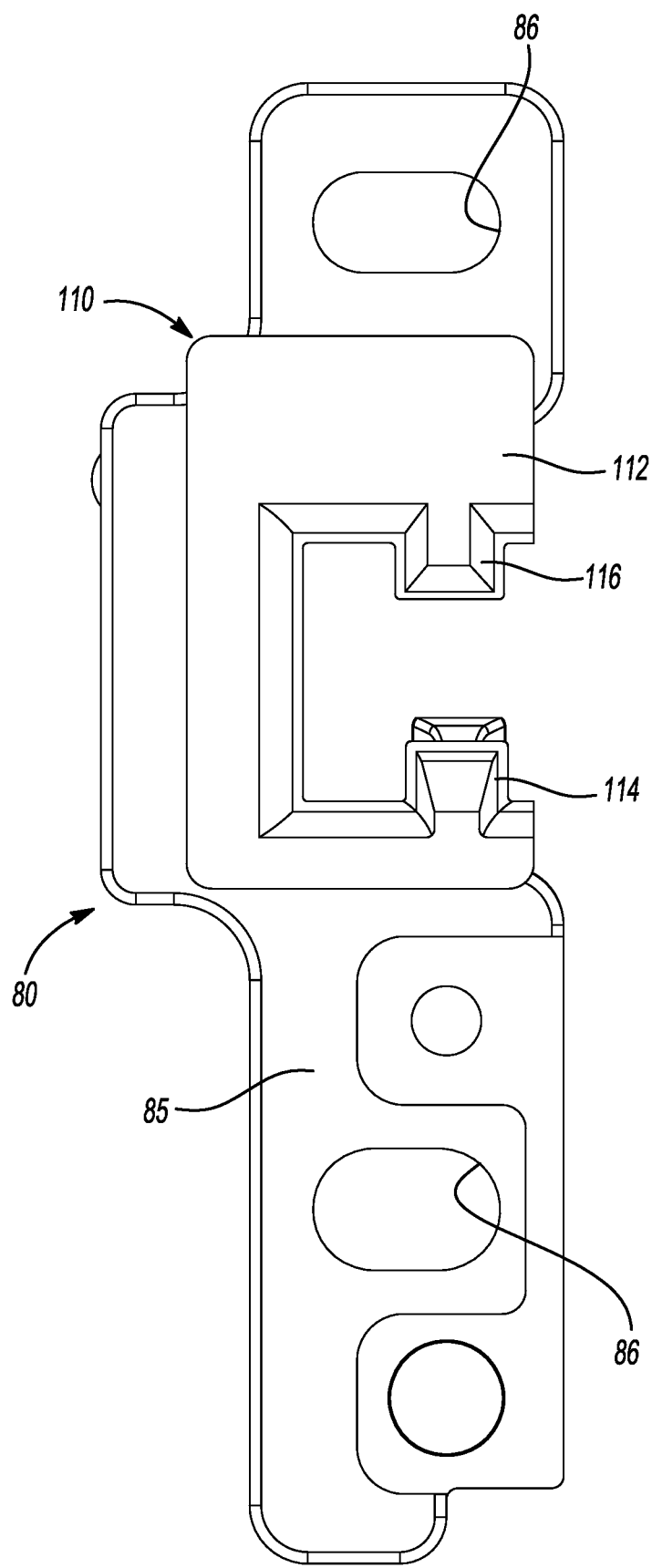
FIG. 10 is a front plan view of the clevis bracket with the insertion tool.
Figure 11:
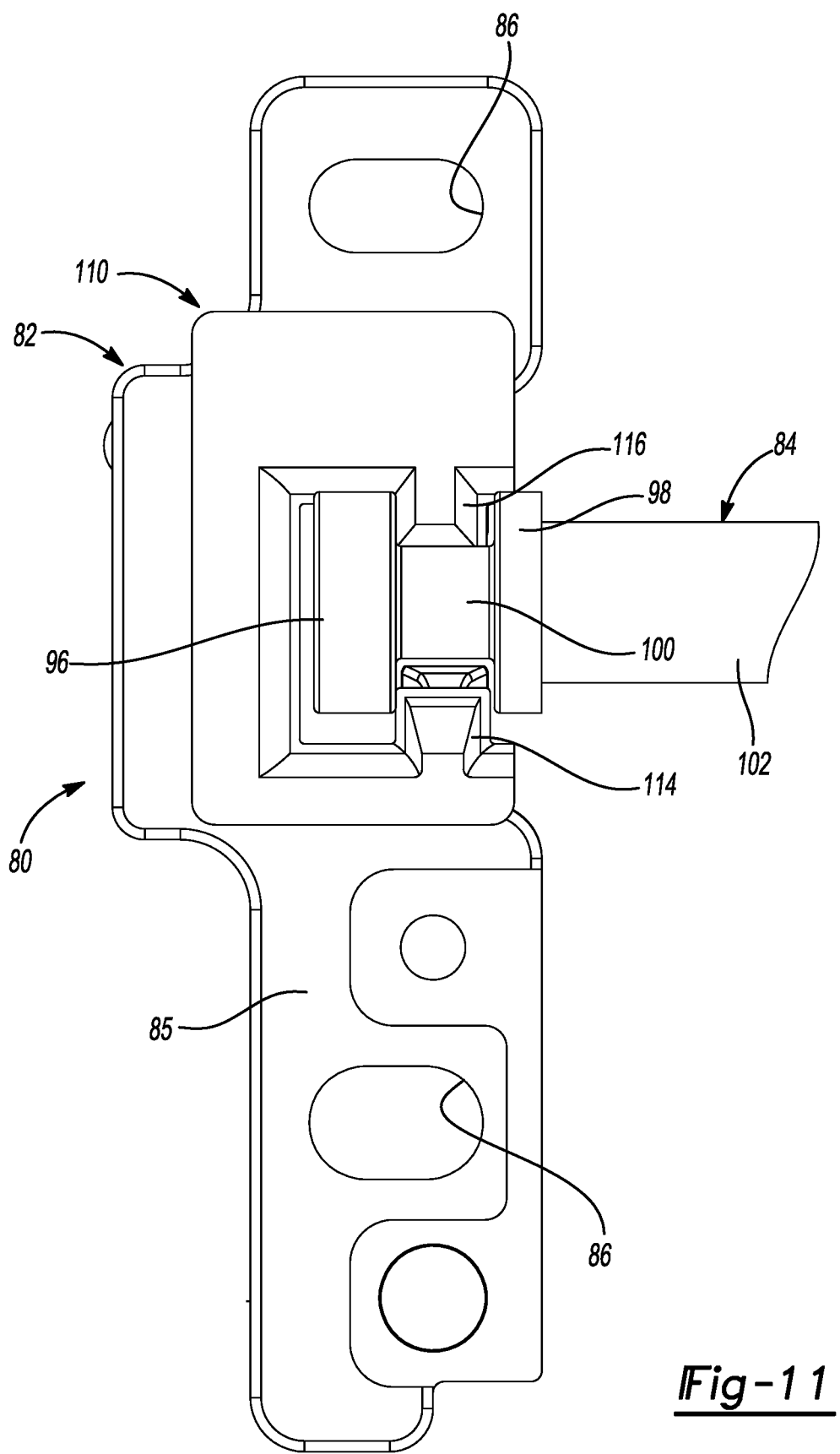
FIG. 11 is a front plan view like FIG. 10 with a striker.
Figure 13:
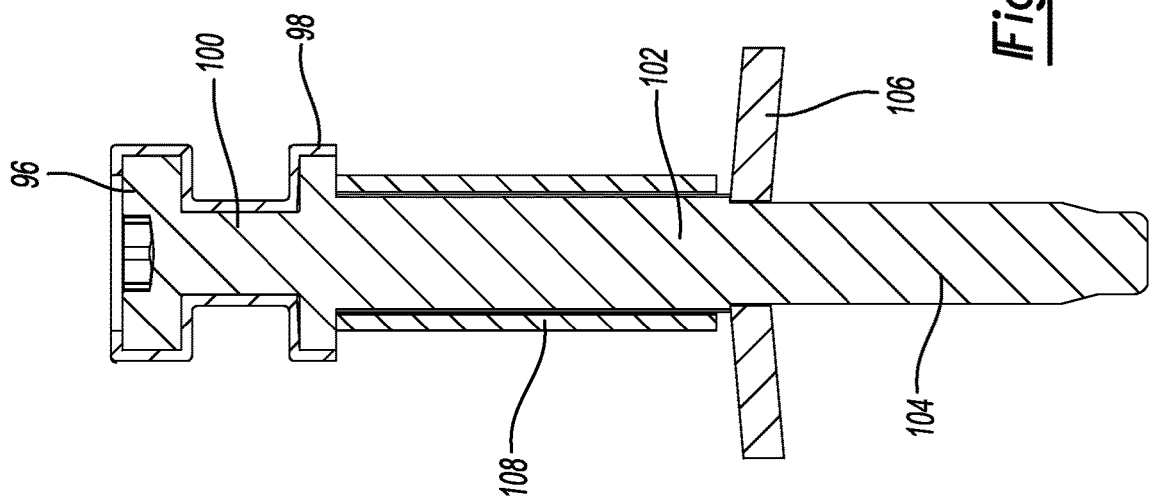
FIG. 13 is a cross-section view of FIG. 12.
Figure 12:
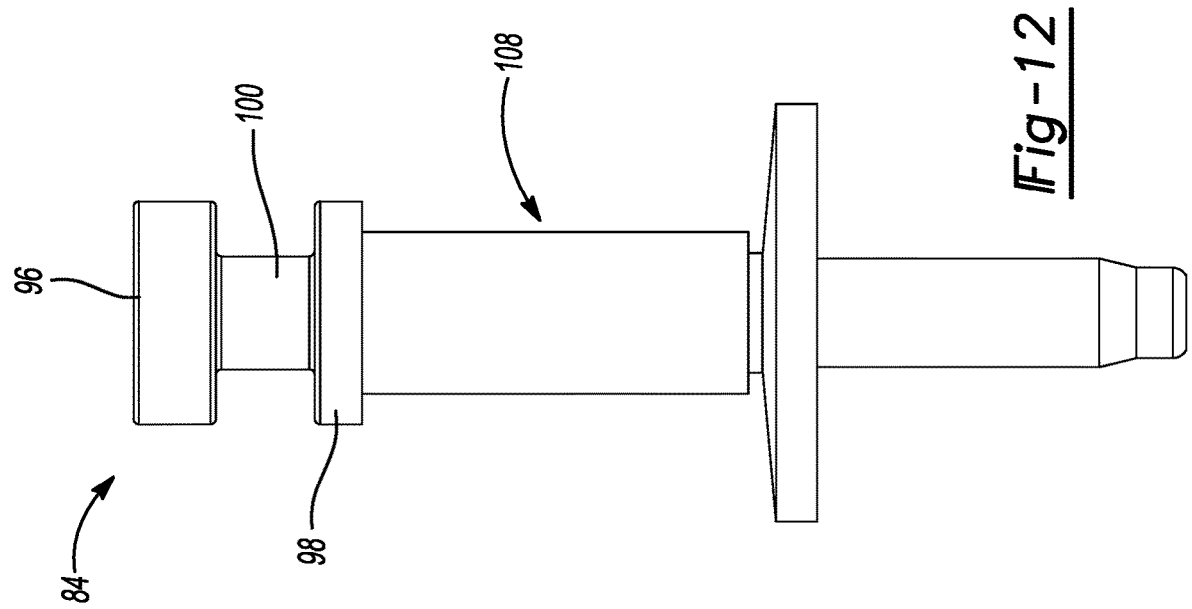
FIG. 12 is a perspective view of a striker.
Figure 15:
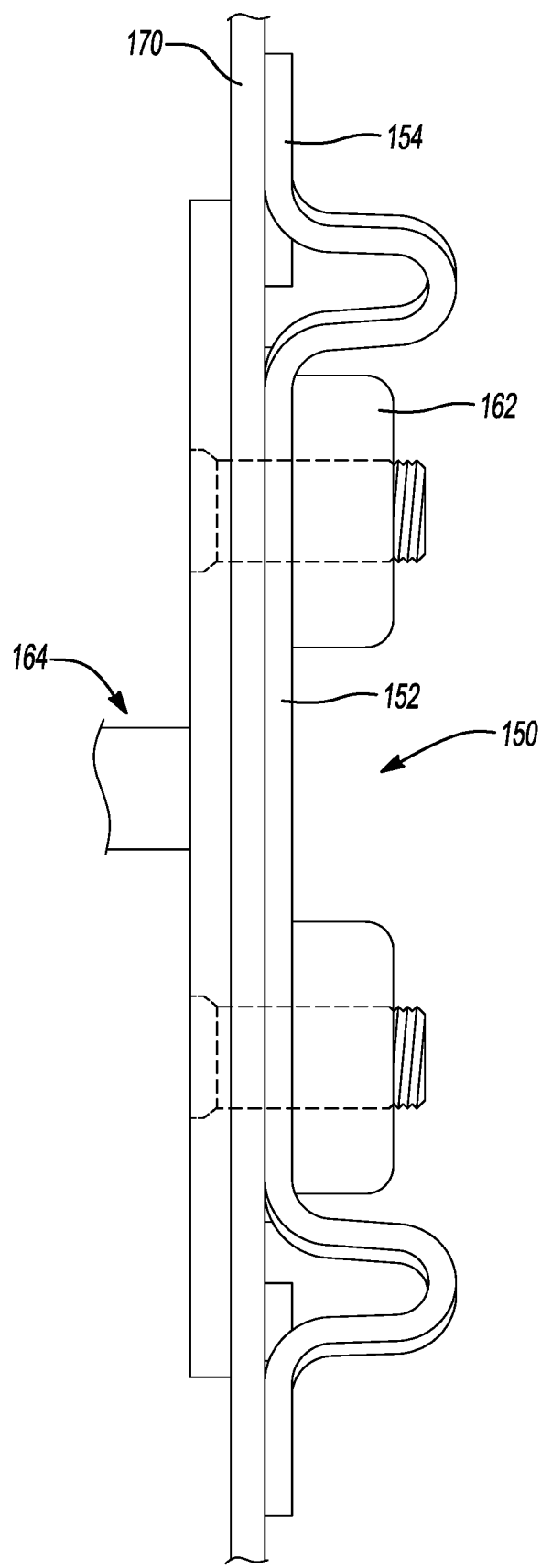
FIG. 15 is a side partially in cross-section view of FIG. 14.
Figure 16:
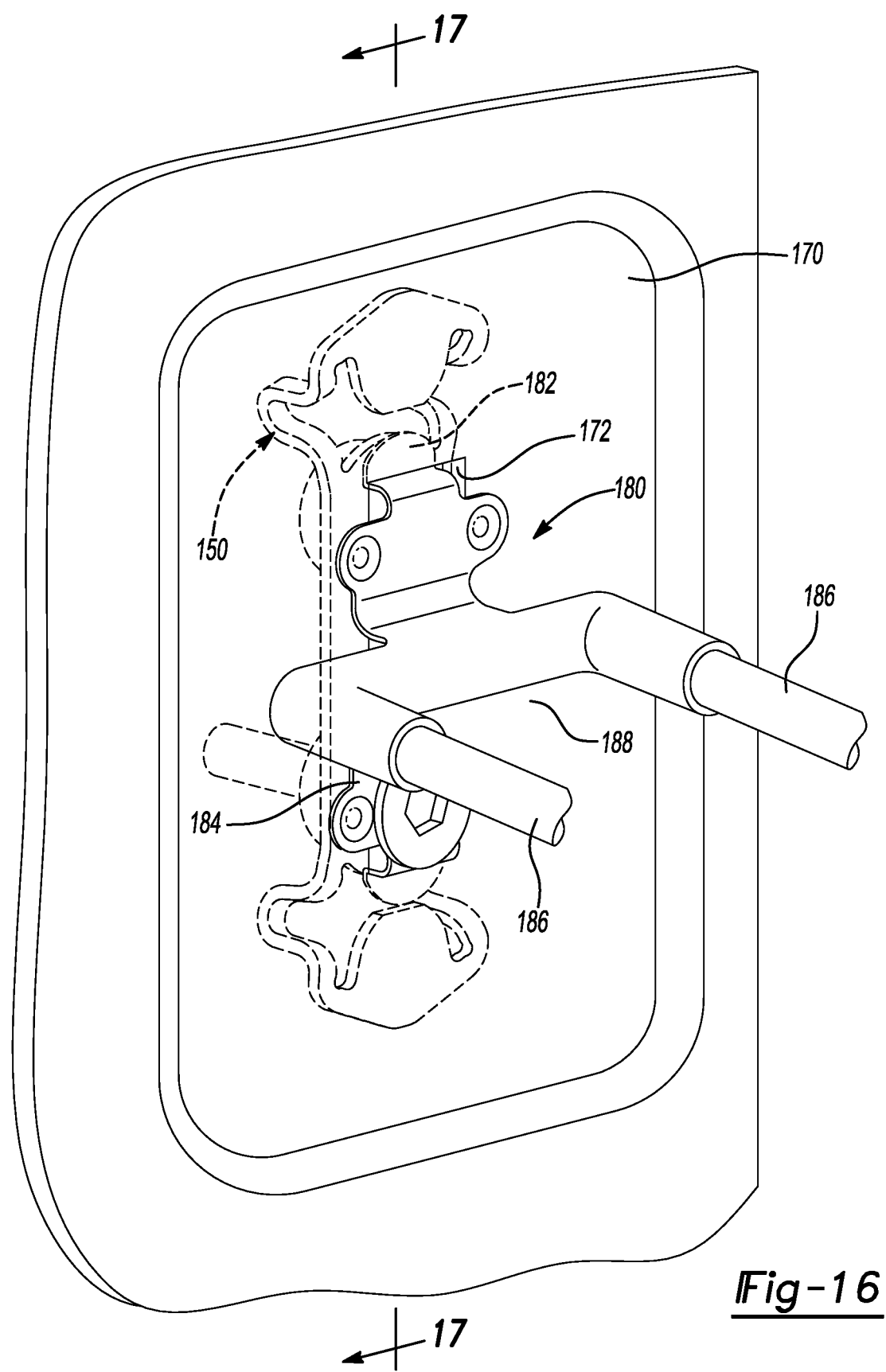
FIG. 16 is a perspective view of a paint assist tool on the tapping plate.

Turning to FIGS. 9-11, an insertion tool 110 is illustrated for setting the clevis bracket 82 with the striker 84. The tool 110 sets the clevis bracket 82 in position in one attempt. The clevis bracket 82 is positioned for essentially the life of the vehicle. The clevis bracket 82 centers the tailgate 30 on the pick-up cargo box 12 while the tailgate 30 is in a closed position. As the tailgate 30 is swung shut, the clevis bracket 82 moves through the space of the double headed striker 84 with some tolerance built in for clearance.

The tool 110 sits inside of the clevis bracket opening 90 while the clevis bracket 82 is loose on the tailgate 30 and the tailgate 30 is in the open position. The tailgate 30 is then closed. The clevis setting tool 110 and the clevis bracket 82 move as a unit based on the location of the striker 84. The bolts that pass through the clevis bracket 82 are then torqued down. The tailgate 30 is opened to remove the tool 110. The tool 110 is also capable of moving the clevis bracket 82, via slot 86, into the exact clearance position required. The tool 110 strategically locates the clevis bracket 82 inside the side beams 44, 46 of the multi-functional tailgate 30 as opposed to guessing the location as in the prior art. This provides the proper clearance so that rubbing or interference is eliminated.

The tool 110 includes a body 112, having an overall C-shape, with projecting wedges 114, 116. The wedges 114, 116 in alignment with the clevis bracket wedges 92, 94 to enable positioning of the striker 84 into the tool 110. Thus, the proper tolerance is formed during setting of the clevis bracket.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
   a cargo box having a floor deck, a pair of sidewalls, a front wall panel, and a rear aft opening configured for receipt of a tailgate having a pair of doors;
   a frame having a cross beam and a pair of side beams, where one side beam extends from each end of the cross beam and the pair of doors are attached to the frame; and
   a clevis bracket positioned on each of the side beams, each of the clevis brackets configured for receipt of a striker provided on each of the sidewalls, the strikers each including two heads, a shaft, and an overmold material on the two heads and the shaft,
   wherein the clevis bracket includes a pair of opposing wedges that are positioned between the two heads that is configured to align the clevis bracket with the striker.

2. The vehicle according to claim 1, wherein the clevis bracket includes a plate having a pair of slots configured for receipt of a fastener, and the slots are elongated to enable positioning of the clevis bracket relative to the striker.

3. The vehicle according to claim 1, wherein the clevis bracket includes an opening that is defined by the pair of opposing wedges, the pair of opposing wedges being configured to restrict movement of the striker along an axis of the striker.

4. The vehicle according to claim 1, wherein the pair of opposing wedges are configured to align the clevis bracket with the striker.

5. The vehicle according to claim 1, wherein a first head of the two heads is positioned on one side of the pair of opposing wedges, and the second head of the two heads is positioned on another side of the pair of opposing wedges.

6. The vehicle according to claim 1, further comprising a tool for positioning the clevis bracket on the side beam that enables adjustment of the clevis bracket relative to the striker during assembly.

7. The vehicle according to claim 6, wherein the tool includes a body and a pair of projecting wedges are configured to be aligned with the pair of opposing wedges to enable positioning of the striker into the tool.

8. The vehicle according to claim 1, further comprising a first metal tapping plate secured with the cross bream, the metal tapping plate having an elongated body with a tab at each end along a longitudinal axis and at least one elongated tang being positioned between the body and each tab, the at least one tang configured to enable movement of the body to enable alignment of the first metal tapping plate relative to the cross-beam; and
   a second tapping plate secured to a sheet metal of at least one of the doors, the second tapping plate including a metal base of the same material as the sheet metal and a metal clinch fastener secured to the base, the clinch fastener being of a different material than the base.

9. The vehicle according claim 8, wherein the first metal tapping plate includes a joggle between the tabs and body.

10. The vehicle according to claim 8, wherein the metal base of the second tapping plate includes an elongated body with a tab at each end, the tabs being offset with respect to the elongated body such that a gap is formed between a plane passing through a front surface of the tabs and a plane passing through a front surface of the elongated body, and
    wherein an elongated tang is positioned between each tab and the elongated body, the at least one tang extending perpendicular to the planes, and the at least one tang being configured to enable adjustment of the elongated body in three degrees of directional movement with respect to the tabs when the tabs are secured to the sheet metal.

11. A tailgate for a vehicle comprising:
    a frame configured to be coupled to the vehicle, the frame having a cross beam and a pair of side beams, where one side beam extends from each end of the cross beam;
    a pair of doors attached to the frame; and
    a clevis bracket positioned on each of the side beams, each of the clevis brackets configured for receipt of a striker provided on the vehicle, the strikers each including two heads, a shaft, and an overmold material on the two heads and the shaft,
    wherein the clevis bracket includes a pair of opposing wedges that are positioned between the two heads that is configured to align the clevis bracket with the striker.

12. The tailgate according to claim 11, wherein the clevis bracket includes a plate having a pair of slots configured for receipt of a fastener, and the slots are elongated to enable positioning of the clevis bracket relative to the striker.

13. The tailgate according to claim 11, wherein the clevis bracket includes an opening that is defined by the pair of opposing wedges, the pair of opposing wedges being configured to restrict movement of the striker along an axis of the striker.

14. The tailgate according to claim 11, wherein the pair of opposing wedges are configured to align the clevis bracket with the striker.

15. The tailgate according to claim 11, wherein a first head of the two heads is positioned on one side of the pair of opposing wedges, and the second head of the two heads is positioned on another side of the pair of opposing wedges.

16. The tailgate according to claim 15, further comprising a tool for positioning the clevis bracket on the side beam that enables adjustment of the clevis bracket relative to the striker during assembly.

17. The tailgate according to claim 16, wherein the tool includes a body and a pair of projecting wedges are configured to be aligned with the pair of opposing wedges to enable positioning of the striker into the tool.

18. The tailgate according to claim 11, further comprising a first metal tapping plate secured with the cross bream, the metal tapping plate having an elongated body with a tab at each end along a longitudinal axis and at least one elongated tang being positioned between the body and each tab, the at least one tang configured to enable movement of the body to enable alignment of the first metal tapping plate relative to the cross-beam; and a second tapping plate secured to a sheet metal of at least one of the doors, the second tapping plate including a metal base of the same material as the sheet metal and a metal clinch fastener secured to the base, the clinch fastener being of a different material than the base.

19. The tailgate according claim 18, wherein the first metal tapping plate includes a joggle between the tabs and body.

20. The tailgate according to claim 18, wherein the metal base of the second tapping plate includes an elongated body with a tab at each end, the tabs being offset with respect to the elongated body such that a gap is formed between a plane passing through a front surface of the tabs and a plane passing through a front surface of the elongated body, and wherein an elongated tang is positioned between each tab and the elongated body, the at least one tang extending perpendicular to the planes, and the at least one tang being configured to enable adjustment of the elongated body in three degrees of directional movement with respect to the tabs when the tabs are secured to the sheet metal.

\* \* \* \* \*